United States Patent

Miyaoh et al.

[11] Patent Number: 5,460,387
[45] Date of Patent: Oct. 24, 1995

[54] METAL LAMINATE GASKET HAVING SEALING MECHANISM FORMED OF RECESS AND FLANGE

[75] Inventors: Yoshio Miyaoh; Susumu Inamura, both of Tokyo, Japan

[73] Assignee: Ishikawa Gasket Co., Ltd., Tokyo, Japan

[21] Appl. No.: 325,481

[22] Filed: Oct. 19, 1994

Related U.S. Application Data

[62] Division of Ser. No. 93,909, Jul. 20, 1993, Pat. No. 5,408,963.

[30] Foreign Application Priority Data

Jul. 21, 1992 [JP] Japan ..................................... 4-56925
Oct. 5, 1992 [JP] Japan ..................................... 4-75192

[51] Int. Cl.⁶ .................................................... F16J 15/08
[52] U.S. Cl. ........................................ 277/235 B; 277/180
[58] Field of Search ................................ 277/180, 235 B, 277/236, 233

[56] References Cited

U.S. PATENT DOCUMENTS 4,836,562 6/1989 Yoshino .............................. 277/235 B
5,125,375 6/1992 Uuk ..................................... 277/235 B
5,310,196 5/1994 Kawaguchi et al. ................ 277/235 B
5,408,963 4/1995 Miyaoh et al. ...................... 277/235 B

FOREIGN PATENT DOCUMENTS 1948681 4/1971 Germany ........................... 277/235 B

*Primary Examiner*—Daniel G. DePumpo
*Attorney, Agent, or Firm*—Kanesaka & Tekeuchi

[57] ABSTRACT

A metal laminate gasket of the invention is used for an internal combustion engine having at least one hole to be sealed. The gasket is basically formed of first and second metal plates extending substantially throughout an entire area of the engine. The first plate includes an annular recess formed at an upper side around a first hole to form a stepped portion. The second plate includes a curved portion to define a second hole to be located inside the first hole, and a flange extending from the curved portion in a direction away from the second hole. The flange has a thickness greater than the depth of the annular recess. When the gasket is assembled, the flange is located above the annular recess. The flange provides surface pressure around the hole of the engine greater than that outside the recess when the gasket is tightened. The surface pressure around the hole may be precisely adjusted.

9 Claims, 2 Drawing Sheets

METAL LAMINATE GASKET HAVING SEALING MECHANISM FORMED OF RECESS AND FLANGE

This is a division of application Ser. No. 08/093,909, filed Jul. 20, 1993 now U.S. Pat. No. 5,408,963.

BACKGROUND OF THE INVENTION AND RELATED ART STATEMENT

The present invention relates to a metal laminate gasket having a sealing mechanism around a hole formed of a recess and a flange.

In a metal laminate gasket for an internal combustion engine, the gasket is formed of a plurality of metal plates laminated together. In order to seal around a hole, such as cylinder bores, water holes and oil holes, a portion around the hole to be sealed is made thick or a bead is formed around the hole. Accordingly, when the gasket is tightened, a high surface pressure is formed and concentrated around the hole to thereby seal therearound.

In case a portion around the hole is made thick, a portion of a metal plate for constituting the gasket is turned around the hole, or a grommet is installed around the hole. In this case, the portion around the hole should not be too thick in order not to excessively concentrate surface pressure around the hole. For this purpose, another sheet having a thickness less than that of the turned portion or flange is installed outside the turned portion. Otherwise, the turned portion is made of a very thin metal plate.

Further, an independent annular plate or shim may be installed around the hole to be sealed.

As stated above, in case the turned portion or grommet is used, it is generally necessary to use another plate located outside the turned portion to regulate surface pressure around the turned portion, which must have a thickness slightly less than that of the turned portion. Further, in case the very thin metal plate is used, it is required to prepare the special thin metal plate.

Also, in case a metal plate is turned, the metal plate must have a predetermined thickness to prevent cracking at the time of turning, though the thickness depends on the quality of the plate.

In a conventional metal gasket as stated above, thus, it is necessary to use an extra metal plate for only adjusting the thickness of the gasket. Also, it is very difficult to precisely adjust a surface pressure around the hole to be sealed.

Accordingly, one object of the present invention is to provide a metal laminate gasket, wherein a surface pressure around the hole to be sealed can be easily and precisely determined.

Another object of the invention is to provide a metal laminate gasket as stated above, wherein the portion around the hole can be sealed with a bead without causing creep relaxation of the bead.

A further object of the invention is to provide a metal laminate gasket as stated above, wherein a surface pressure around the hole can be locally adjusted with reference to the distance from the bolt holes.

Further objects and advantages of the invention will be apparent from the following description of the invention.

SUMMARY OF THE INVENTION

In accordance with the present invention, a metal laminate gasket is used for an internal combustion engine having at least one hole to be sealed. The gasket is basically formed of first and second metal plates piled together and extending substantially throughout an entire area of the engine.

The first plate includes a first hole corresponding to the hole of the engine, and an annular recess formed at an upper side around the first hole to form a stepped portion having a thickness less than a thickness outside the stepped portion. The second plate includes a main portion situated under the first plate, a second hole smaller than the first hole, a curved portion extending from the main portion to define the second hole, and a flange extending from the curved portion in a direction away from the second hole.

When the first and second plates are assembled, the flange is located in or above the annular recess without laterally extending over the annular recess. The flange has a thickness greater than the depth of the annular recess so that when the gasket is tightened, the flange provides high surface pressure around the hole of the engine. Namely, the surface pressure is formed based on the difference between the thickness of the flange and the depth of the recess.

The recess at the first plate is formed by a coining process or compression deformation. Thus, the depth of the recess can be easily and precisely made, so that the surface pressure around the hole can be precisely adjusted. Since the recess is formed, it is not required to use a plate for adjusting surface pressure, as well.

The gasket may further include a third metal plate situated above the first plate. The third plate includes a third hole and an annular portion located under the flange of the second plate. The third plate may further include a bead located around the annular portion and protruding in a direction away from the first plate without laminating the flange. A side portion for defining the annular recess is disposed under the bead.

Since the flange is made thicker than the depth of the recess, the bead is not fully compressed when the gasket is tightened. Thus, creep relaxation of the bead and deformation of the side portion of the recess are prevented when the gasket is tightened.

In the present invention, in case the gasket is used as a cylinder head gasket and the portion around the cylinder bore is sealed, the depth of the annular recess may be changed based on the distances from bolt holes to thereby regulate the surface pressure around the cylinder bore. Namely, portions of the annular recess located away from the bolt holes are made shallowest and portions of the annular recess located close to the bolt holes are made deepest. In this case, the depth of the annular recess is gradually changed.

Generally, the portions located away from the bolt holes can not receive sufficient tightening pressures by the bolts, while the portions located near the bolt holes receive high tightening pressures. In order to provide sufficient tightening pressures to the portions away from the bolt holes, the depth of the annular recess near the bolt holes is made deepest, so that the tightening pressure is not applied too much to the portions near the bolts. Also, the depth of the annular recess at the portions away from the bolt holes is made shallowest, so that high tightening pressures is, are applied to those portions. Accordingly, the sufficient tightening pressure can be applied around the entire cylinder bore.

When a sufficient tightening pressure can be applied around the cylinder bore by the bolts, the recess may have the constant depth.

In all the embodiments of the present invention, a wire ring may be installed outside the curved portion. Thus, the wire ring may additionally provide a surface pressure around the cylinder bore.

DETAILED DESCRIPTION OF PREFERRED EMBODIMENTS

Figure 1:
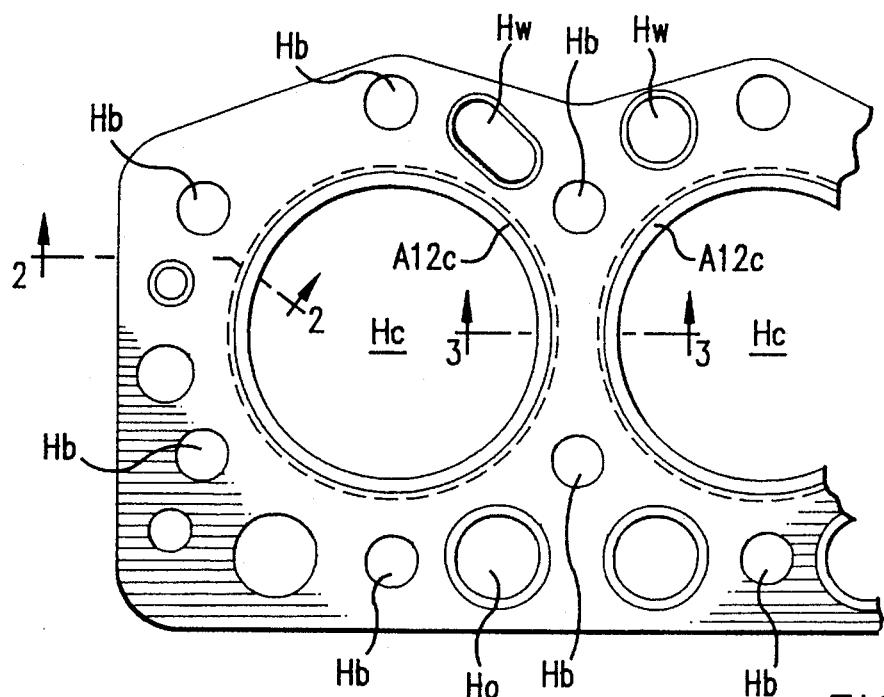
FIG. 1 is a partial plan view of a first embodiment of a metal laminate type cylinder head gasket of the invention.
Figure 2:
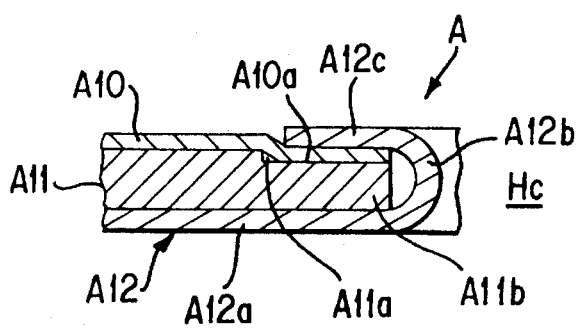
FIG. 2 is an enlarged section view taken along a line 2—2 in FIG. 1.
Figure 3:
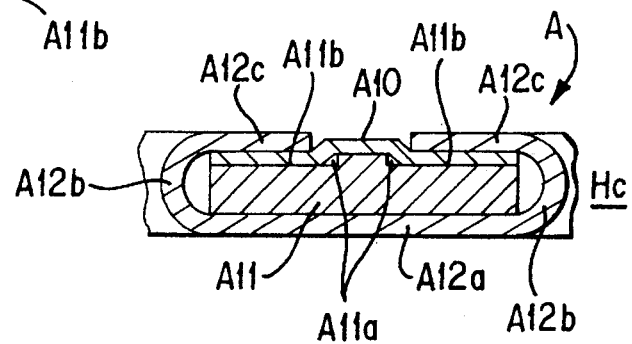
FIG. 3 is an enlarged section view taken along a line 3—3 in FIG. 1.

Referring to FIGS. 1–3, a first embodiment A of a metal laminate gasket of the invention is shown. The gasket A is a cylinder head gasket and includes a plurality of cylinder bores Hc, water holes Hw, oil holes Ho, bolt holes Hb, and so on, as in the conventional gasket.

In the gasket A, a sealing mechanism of the invention is formed around the cylinder bore Hc, which is explained hereunder. Other holes may be sealed by any sealing means, so that the explanation thereof is omitted. However, it is possible to use the same sealing mechanism for other holes.

As shown in FIGS. 2 and 3, the gasket A is formed of an upper plate A10, a middle plate A11 and a lower plate A12, which are laminated together and extend substantially throughout an entire area of the gasket.

The upper plate A10 includes a hole for the cylinder bore Hc and an annular portion A10a around the hole for the cylinder bore Hc. The middle plate A11 includes a hole for the cylinder bore Hc, and an annular recess A11a at an upper surface around the hole to form a stepped portion A11b therearound. The annular portion A10a is located in the annular recess A11a when assembled together.

The recess A11a is formed by coining process or compression deformation, so that the depth of the recess A11a can be precisely adjusted and formed. The stepped portion A11b has a predetermined thickness.

The lower plate A12 includes a main portion A12a situated under the middle plate A11, a curved portion A12b to define the cylinder bore Hc and a flange A12c located above the annular portion A10a. The flange A12c has a thickness slightly greater than the depth of the recess A11a, and does not extend laterally beyond the recess A11a. Thus, the flange A12c is located in or above the annular recess A11a.

In the gasket A, the upper plate A10 has a constant thickness. Thus, when the gasket A is tightened, the flange A12c slightly projects outwardly around the cylinder bore beyond the upper surface of the upper plate A10. Namely, the flange A12c projects outwardly for the distance of deleting the depth of the recess A11a from the thickness of the flange A12c. The distance is precisely determined to regulate the surface pressure around the cylinder bore Hc. Thus, the predetermined surface pressure is formed around the cylinder bore Hc.

In the present invention, the recess A11a is formed by a coining process. Thus, the depth of the recess can be precisely adjusted when comparing with a metal plate having a predetermined thickness. Accordingly, it is possible to easily and precisely adjust the surface pressure around the cylinder bore in combination with the flange A12b.

As shown in FIG. 3, the recesses A11a for the respective cylinder bores Hc do not overlap at a portion between the two cylinder bores Hc, and a center portion slightly projects outwardly. Thus, creep relaxation is prevented at the portion between the cylinder bores Hc, and the portions around the cylinder bores can be sealed properly.

Figure 4:
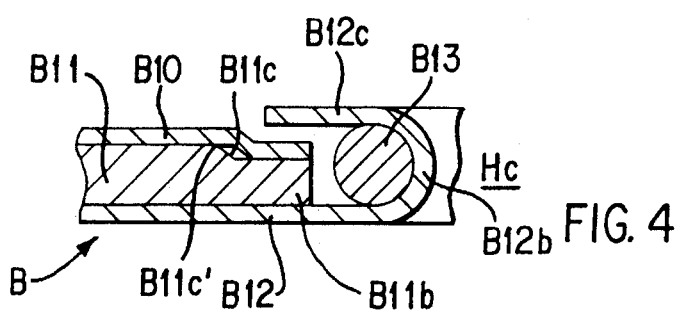
FIGS. 4–6 are section views, similar to FIG. 2, for showing second to fourth embodiments of the invention.

FIG. 4 shows a second embodiment B of a metal laminate gasket of the invention. The gasket B includes an upper plate B10, a middle plate B11 with a stepped portion B11b, and a lower plate B12 with a curved portion B12b and a flange B12c, similar to the gasket A. In the gasket B, however, a wire ring B13 is installed adjacent the curved portion B12b. Also, a side wall B11c for defining an annular recess is formed to incline relative to the upper surface of the plate B11b with a rounded upper edge B11c'.

The wire ring B13 is selected so that the thickness is substantially reduced to the thickness of the stepped portion B11b when the gasket is tightened. In the gasket B, the surface pressures are formed at the wire ring and the stepped portion to thereby securely seal around the cylinder bore Hc.

In the gasket B, since the inclined side wall B11c is used, when the gasket B is compressed, no special stress is applied to that portion. Thus, the side wall B11c does not deform. Also, there is no possibility for forming a crack at the bending portion of the upper plate B10 above the inclined side wall B11c.

Figure 5:
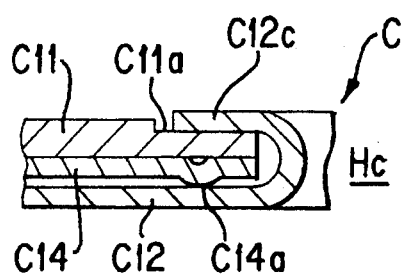

FIG. 5 shows a third embodiment C of a metal laminate gasket of the invention. The gasket C includes a plate C11 with a recess C11a, and a plate C12 with a flange C12c, similar to the gasket A. The gasket C further includes a plate C14 with a bead C14a situated between the plates C11, C12.

Although an upper plate like the plate A10 in FIG. 2 is not formed in the gasket C, the flange C12c slightly projects upwardly from the upper surface of the plate C11. Thus, the flange C12c can securely seal around the cylinder bore Hc. The bead C14a helps sealing around the cylinder bore Hc. The gasket C operates as in the gasket A.

Figure 6:
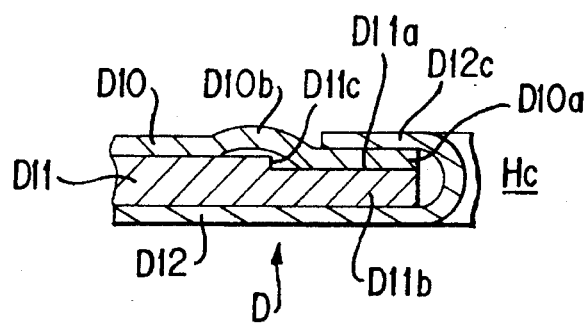
Figure 7:
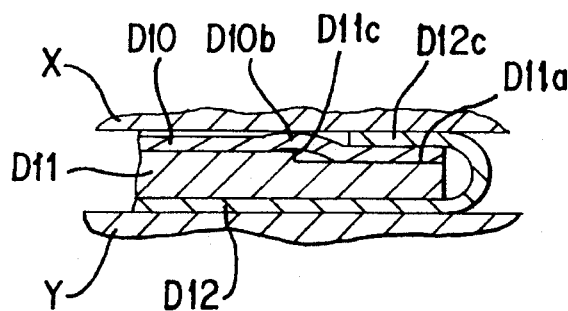
FIG. 7 is a section view for showing a condition that the gasket as shown in FIG. 6 is compressed.

FIGS. 6 and 7 show a fourth embodiment D of a metal laminate gasket of the invention. The gasket D is formed of an upper plate D10 with an annular portion D10a, a middle plate D11 with an annular recess D11a and a stepped portion D11b, and a lower plate D12 with a flange D12c, as in the gasket A. In the gasket D, however, the upper plate D10 further includes a bead D10b radially outside the annular portion D10a relative to the cylinder bore Hc.

In the gasket D, the flange D12c is located only on the annular portion D10a, not on the bead D10b. Also, the bead D10b projects outwardly without contacting a side wall D11c for the annular recess D11a. The thickness of the flange D12c is greater than the depth of the annular recess D11a, as in the gasket A.

Thus, when the gasket D is tightened between a cylinder head X and a cylinder block Y, as shown in FIG. 7, although the flange D12c is completely compressed, the bead D1Ob is only slightly compressed, not fully flattened. Thus, the bead D10b provides sufficient surface pressure thereat, but creep relaxation of the bead D10b is prevented.

Also, since the side wall D11c is not compressed by the upper plate D10 or bead D10b, the deformation of the side wall D11c and formation of crack at the upper plate are prevented. The gasket D can securely seal around the cylinder bore Hc.

Figure 8:
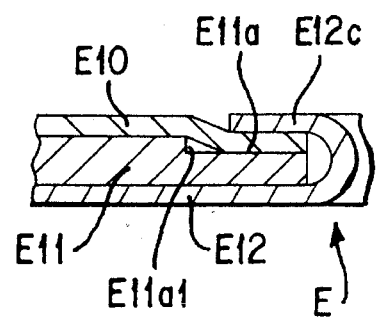
FIG. 8 is a section view, similar to FIG. 2, for showing a fifth embodiment of the invention.
Figure 9:
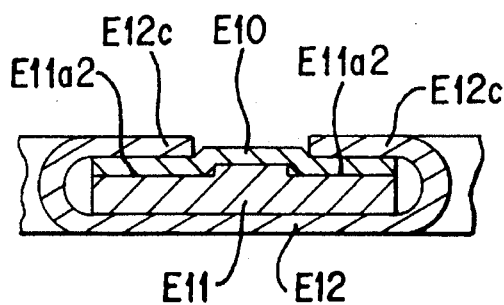
FIG. 9 is a section view, similar to FIG. 3, for showing the fifth embodiment of the invention.

FIGS. 8 and 9 show a fifth embodiment E of a metal laminate gasket of the invention. FIG. 8 shows a section view near a bolt hole Hb, similar to the section taken along a line 2—2 in FIG. 1, while FIG. 9 shows a section view at a portion away from the bolt hole, similar to the section taken along a line 3—3 in FIG. 1.

The gasket E is formed of an upper plate E10, a middle plate E11 with an annular recess E11a, and a lower plate E12 with a flange E12c, similar to the gasket A. However, in the gasket E, the depth of the annular recess E11a is changed based on the distances from the bolt holes Hb to regulate the surface pressure around the cylinder bore Hc.

Namely, when the gasket E is tightened, the portions near the bolt holes Hb can receive high tightening pressures from the bolts, but the portions away from the bolt holes Hb receive tightening pressures less that those near the bolt holes Hb. In case the cylinder head has sufficient rigidity, the present invention is used such that portions away from the bolt holes Hb are designed to have high surface pressures.

In the gasket E, the depths of the portions E11a1 near the bolt holes Hb (FIG. 8) are made deepest, while the depths of the portions E11a2 away from the bolt holes Hb (FIG. 9) are made shallowest. For example, in the gasket as shown in FIG. 1, since six bolt holes are formed around the cylinder bore Hc, six deep portions E11a1 and six shallow portions are formed in one annular recess E11a. The depth between the deep portion and the shallow portion gradually changes.

In the gasket E, the thickness of the flange E12c does not change, but the depth of the annular recess E11a is gradually changed as explained above. Thus, when the gasket E is tightened, the surface pressures near the bolt holes are not made so strong, while the surface pressures away from the bolt holes are made strong. The surface pressures around the cylinder bore Hc can be changed smoothly.

In this respect, if a surface pressure regulation plate is installed around a cylinder bore, it requires additional plate. Also, it is very difficult to smoothly regulate the pressure. However, in the gasket E, since the depth of the recess is only changed, the surface pressure can be easily changed. The gasket E can properly regulate the surface pressure around the cylinder bore.

Figure 10:
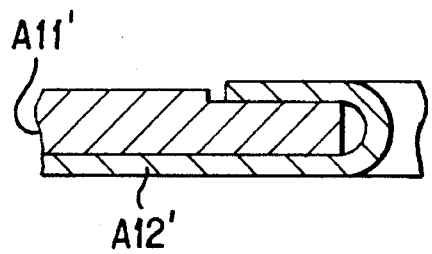
FIG. 10 is a section view, similar to FIG. 2, for showing a gasket formed of two plates.

In the embodiments as explained above, the gasket is generally formed of three plates. However, the gasket can be formed of two plates, or four or more plates. Also, a wire ring may be used for all the embodiments. In FIG. 10, a gasket formed of two plates is shown, which is exactly the same as the gasket A without the upper plate A10.

In the present invention, the surface pressure around the hole can be easily and precisely adjusted. Also, the surface pressure around the hole can be locally changed.

While the invention has been explained with reference to the specific embodiments of the invention, the explanation is illustrative, and the invention is limited only by the appended claims.

What is claimed is:

1. A metal laminate gasket for an internal combustion engine having at least one hole to be sealed, consisting essentially of:

a first metal plate extending substantially throughout an entire area of the engine, said first plate having a first hole corresponding to the hole of the engine, and an annular recess formed at an upper side around the first hole to form a stepped portion having a thickness less than a thickness outside the stepped portion, and a second metal plate assembled with the first plate, said second plate having a main portion situated under the first plate, a second hole smaller than the first hole, a curved portion extending from the main portion to define the second hole and located inside the first hole, and a flange extending from the curved portion in a direction away from the second hole, said flange having a thickness greater than a depth of the annular recess so that when the gasket is tightened, the flange is located above the annular recess to provide surface pressure around the hole of the engine greater than that outside the recess.

2. A metal laminate gasket according to claim 1, wherein said engine is formed of two engine parts and includes at least one cylinder bore, and bolt holes for tightening the engine parts together, said annular recess being formed around said at least one cylinder bore.

3. A metal laminate gasket according to claim 2, wherein said engine includes at least two cylinder bores, said gasket having one intermediate area located between said at least two cylinder bores, said recess being formed around the respective cylinder bores without intersecting with each other.

4. A metal laminate gasket according to claim 1, wherein the thickness of the stepped portion is constant substantially throughout an entire area thereof.

5. A metal laminate gasket according to claim 2, wherein said depth of the annular recess is changed based on distances from the bolt holes to thereby regulate surface pressure around the cylinder bore.

6. A metal laminate gasket according to claim 5, wherein portions of the annular recess located farthest away from the bolt holes are made shallowest and portions of the annular recess located closest to the bolt holes are made deepest, the depth of the annular recess being gradually changed so that the surface pressure around the cylinder bore is regulated.

7. A metal laminate gasket according to claim 6, wherein said engine includes at least two cylinder bores, said gasket having one intermediate area located between said at least two cylinder bores, the depth of the annular recess at the intermediate area being made shallowest.

8. A metal laminate gasket for an internal combustion engine having at least one hole to be sealed, comprising:

a first metal plate extending substantially throughout an entire area of the engine, said first plate having a first hole corresponding to the hole of the engine, and an annular recess formed at an upper side around the first hole to form a stepped portion having a thickness less than a thickness outside the stepped portion, a second metal plate assembled with the first plate, said second plate having a main portion situated under the first plate, a second hole smaller than the first hole, a curved portion extending from the main portion to define the second hole and located inside the first hole, and a flange extending from the curved portion in a direction away from the second hole, said flange having a thickness greater than a depth of the annular recess so that when the gasket is tightened, the flange is located above the annular recess to provide surface pressure around the hole of the engine greater than that outside the recess, and a third metal plate situated between the first plate and the main portion of the second plate, said third plate having a third hole corresponding to the first hole and means for sealing around the third hole.

9. A metal laminate gasket according to claim 8, wherein said means for sealing around the third hole is a bead, said bead being compressed to seal around the hole of the engine when the gasket is tightened.

* * * * *

UNITED STATES PATENT AND TRADEMARK OFFICE
CERTIFICATE OF CORRECTION

PATENT NO. : 5,460,387
DATED : October 24, 1995
INVENTOR(S) : Yoshio Miyaoh

It is certified that error appears in the above-indentified patent and that said Letters Patent is hereby corrected as shown below:

```
In column 2, line 23, after "adjusting" add --a--; and
             line 57, delete "is,".
In column 3, line 32, change "the" to --an--; and
             line 45, before "coining" add --a--.
In column 4, line 64, before "sufficient" add --a--.
In column 5, line 1, change "crack" to --cracking--.
```

Signed and Sealed this

Twenty-seventh Day of February, 1996

Attest:

BRUCE LEHMAN

Attesting Officer     Commissioner of Patents and Trademarks